(No Model.) 2 Sheets—Sheet 1.

A. PERKINS.
PEDAL.

No. 520,009. Patented May 15, 1894.

Witnesses:
Harry T. Rohrer
John G. Wood

Inventor:
Albert Perkins
By Wiles & Greene,
Attys.

(No Model.) 2 Sheets—Sheet 2.

A. PERKINS.
PEDAL.

No. 520,009. Patented May 15, 1894.

Witnesses:
Harry T. Rohrer
John C. Wood

Inventor:
Albert Perkins
By Niles & Greene
Attys.

THE NATIONAL LITHOGRAPHING COMPANY,
WASHINGTON, D. C.

UNITED STATES PATENT OFFICE.

ALBERT PERKINS, OF CHICOPEE, MASSACHUSETTS, ASSIGNOR TO THE A. G. SPALDING & BROTHERS, OF NEW YORK, N. Y., AND THE LAMB KNITTING MACHINE MANUFACTURING COMPANY, OF CHICOPEE, MASSACHUSETTS.

PEDAL.

SPECIFICATION forming part of Letters Patent No. 520,009, dated May 15, 1894.

Application filed May 26, 1893. Serial No. 475,614. (No model.)

*To all whom it may concern:*

Be it known that I, ALBERT PERKINS, a citizen of the United States, residing at Chicopee, in the county of Hampden and State of Massachusetts, have invented certain new and useful Improvements in Pedals; and I do hereby declare that the following is a full, clear, and exact description of the invention, which will enable others skilled in the art to which it appertains to use the same.

In outline the pedal is an oval flattened at each end of each axis and its body is made in duplicate parts or halves from thin sheet steel and these when properly formed are riveted together to form a plate of double thickness. Each half is cut from a sheet of metal and pressed into shape by dies that throw out a half cylinder along the line of the major axis and turn outward a flange around the entire margin except near the ends of said axis where the plate is cut away slightly within the general outline. The construction will be best understood by referring to the accompanying drawings, in which—

Figure 1:
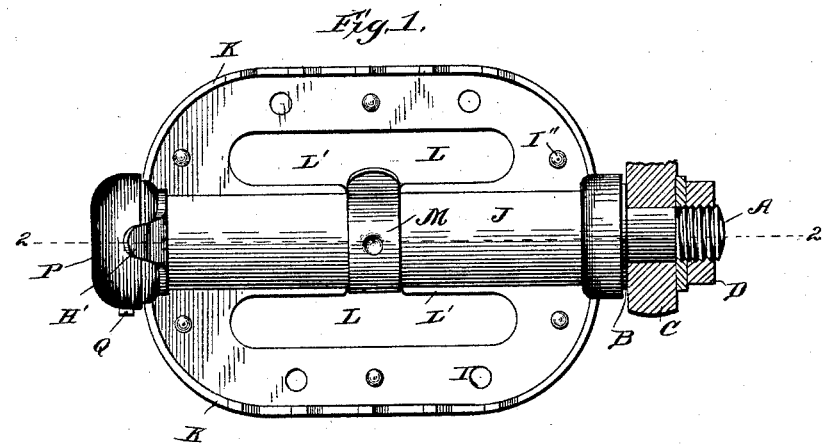
Figure 2:
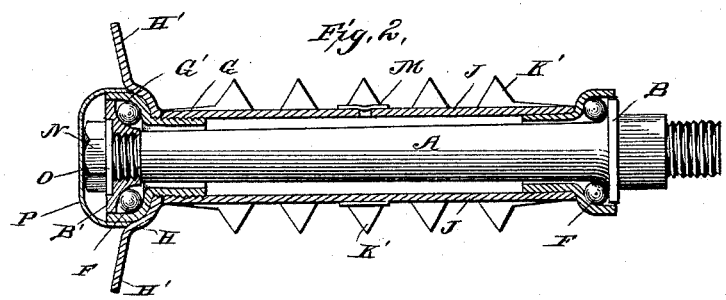
Figure 3:
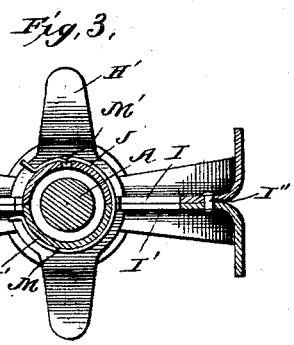
Figure 4:
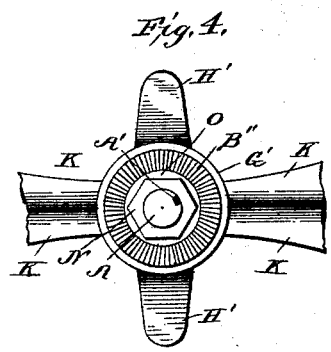
Figure 5:
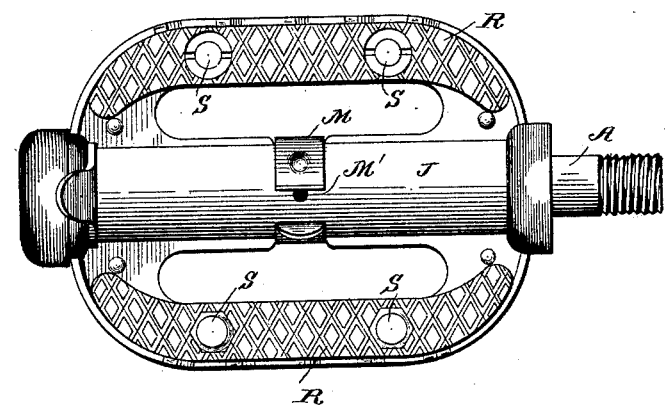
Figure 6:
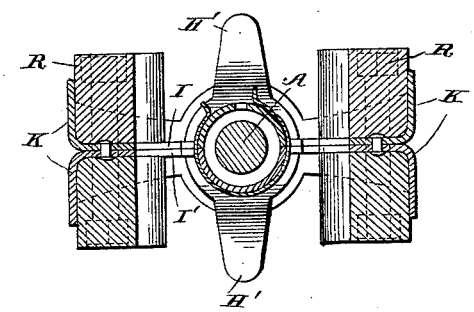
Figure 7:
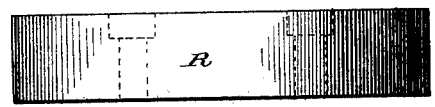
Figure 8:
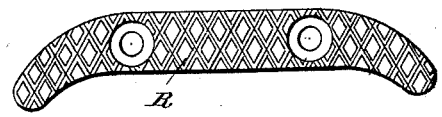

Figure 1 is a plan of the pedal. Fig. 2 is an axial section of the same. Fig. 3 is a central cross section. Fig. 4 is an end view of the axle and adjacent parts. Figs. 5 and 6 are views corresponding to Figs. 1 and 3 but showing a slight modification. Figs. 7 and 8 are detail views.

In the figures, A is a pedal axle provided with a fixed cone B, which also serves as a shoulder for the crank C when the pedal is secured to the crank by a nut D in the usual manner. At its free end the axle is threaded and provided with an adjustable cone B'. The two cones form the bearings to receive the inward pressure and the end thrust, with respect to the axle, of two series of balls F whose opposing bearings are the expanded ends G' of two short tubes G slipped over the axle but too large internally to come in contact therewith. The tubes are formed from sheet steel in a manner not herein important, and over the outer one is screwed a thin steel disk H, perforated to fit the tube notched to engage the edges of the plates and pressed into cup shape to fit the external surface of the tube's enlarged end G'. Fingers H' project out upon diametrically opposite sides of the disk and serve, in the complete pedal, to prevent the foot from passing too far outward. The tubes are rigidly secured to and connected by the body of the pedal which is made up of two thin steel plates I, I' formed as has been stated and united by rivets I''. The constituent plates are bent outward to form half cylinders J, J', and these when the plates are united supplement each other and form a complete hollow cylinder whose internal diameter equals the external diameter of the tubes G to which the cylinder is fixed by brazing or otherwise. The compound plate is cut away at the ends of the cylinder to allow the enlarged ends of the tubes G to come partially within the general outer line of the plate, and from one of these enlarged ends around to the other the compound plate has upon each face a marginal flange K, formed by bending up in opposite directions the edges of the constituent plates. Each flange has teeth K' along that portion which is parallel to the axle. The compound plate is cut away at L in such manner as to leave a narrow flange L' along each side of the central cylinder, and these flanges are themselves cut away near the middle to form a way for a thin steel spring M which slides bodily around the cylinder in the ordinary manner to cover and uncover an oil-hole M'. The body of the spring is slightly wider than the way in the flanges, but is narrowed at the proper place, so that the sliding of the spring is limited, and since it cannot be displaced in any direction, no care whatever is necessary in its manipulation. Each cone lies almost wholly within the opposing bearing or ball case, the better to exclude dust, and hence the outer one which is adjustable cannot be turned by pressure applied to its periphery. The outer annular portion B'' of its end face is therefore milled or corrugated so that it may be rotated by pressure upon its end or outer face. Its displacement by the rotation of the locking nut N is guarded against by interposing a smooth washer O having the usual inwardly projecting spur to lie in a channel A' cut in the axle. The washer is sunk into the cone so that its outer face is flush therewith and hence its presence adds nothing to the weight nor to the requisite length of the axle which is made barely long enough to receive the nut N. A cup-shaped metal cap P slips over or telescopes the end of the outer tube G' covering and protecting it and the parts seen within its margin in Fig. 4. The cap is held in place by a screw Q working in the end portion of the tube G', the margin of the cap being notched to pass beyond the shaft of the screw and the T head of the screw biting or pressing upon portions adjacent to the notch when the screw is turned very slightly.

It is evident that the pedal is extremely compact, light, strong and neat in appearance, and it is also very readily made and at a small cost.

In Figs. 5, 6, 7, and 8 the construction of most parts of the pedal precisely such as has been described, although the teeth may be omitted and the pedal is provided with four pieces of rubber R which at each side of each face of the pedal form narrow pads to receive the pressure of the foot. They are secured to the compound plate by bolts S that pass through each pair and the intervening plate, and they are all supported against the usual and heaviest pressure of the foot by the flanges against which they lie. They are somewhat thicker than the depth of the flange so that the latter are relieved of all pressure direct from the foot.

When the teeth are present as shown the pedal may be quickly converted from the rubber to the "rat-trap" form. It is plain that the rubbers may be readily replaced when worn and that the loss or waste of rubber in so doing is inconsiderable.

What I claim is—

1. A pedal whose body consists of two steel plates rigidly united to form a compound plate of double thickness having its constituent plates bent oppositely outward to form a central hollow cylinder and its margins bent also outward to form marginal flanges upon both faces of the compound plate, substantially as set forth.

2. The combination with the pedal body consisting of two steel plates rigidly united to form a compound plate of double thickness having its component plates bent out oppositely to form an axial hollow cylinder, of short steel tubes brazed, respectively, in the ends of said cylinder, substantially as and for the purpose set forth.

3. The combination with the pedal body consisting of two metal plates rigidly united to form a compound plate of double thickness having its component plates bent oppositely outward to form an axial hollow cylinder, of short steel tubes brazed, respectively, in the ends of said cylinder and having their own outer ends enlarged, and the steel disk fitting and fixed to one of said enlarged ends and provided with the projecting fingers, substantially as set forth.

4. The combination with two plates rigidly united into a compound pedal plate having upon each side of the axial line teeth bent up oppositely at right angles to the plane of the plate, of pedal rubbers detachably secured to the plate and supported laterally by said teeth.

5. The combination with a pedal shaft of a pedal body consisting of a plate made up of two thin plates riveted together and bent oppositely to form a cylinder in the axis of the body and marginal flanges upon both its faces, short tubes brazed in the ends of the cylinder to form bearings or ball cases, balls lying in said bearings, cones upon the axle coacting with said bearings to hold the balls, and the screw-retained cap fitting over the outer of said tubes and covering the end of the axle.

ALBERT PERKINS.

Witnesses:
SIDNEY SANDERS,
HENRY N. LYON.